（12）United States Patent
Maeda et al.

(10) Patent No.: US 9,903,453 B2
(45) Date of Patent: Feb. 27, 2018

(54) RECLINING DEVICE

(71) Applicant: SHIROKI CORPORATION, Fujisawa-shi (JP)

(72) Inventors: Noriaki Maeda, Fujisawa (JP); Hidehiko Fujioka, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/226,428

(22) Filed: Aug. 2, 2016

(65) Prior Publication Data
US 2017/0037945 A1 Feb. 9, 2017

(30) Foreign Application Priority Data
Aug. 7, 2015 (JP) .................. 2015-157617

(51) Int. Cl.
G05G 5/06 (2006.01)
A47C 1/02 (2006.01)
B60N 2/235 (2006.01)
F16H 31/00 (2006.01)

(52) U.S. Cl.
CPC ............ *F16H 31/004* (2013.01); *A47C 1/02* (2013.01); *B60N 2/2356* (2013.01)

(58) Field of Classification Search
CPC .......... F16H 31/004; A47C 1/02; B60N 2/20; B60N 2/235; B60N 2/2356; B60N 2/2362; G05G 5/18; G05G 5/24
See application file for complete search history.

(56) References Cited

U.S. PATENT DOCUMENTS

| 7,988,233 | B2* | 8/2011 | Yamada | B60N 2/236 297/367 L |
| 8,602,498 | B2* | 12/2013 | Yamada | B60N 2/2356 297/367 L |
| 8,955,911 | B2* | 2/2015 | Yamada | B60N 2/2356 297/367 L |
| 8,998,330 | B2* | 4/2015 | Ito | B60N 2/2356 297/367 L |
| 9,078,522 | B2* | 7/2015 | Ito | A47C 1/025 |
| 9,108,545 | B2* | 8/2015 | Maeda | B60N 2/4228 |
| 9,376,036 | B2* | 6/2016 | Wei | B60N 2/2356 |
| 9,616,780 | B2* | 4/2017 | Gallienne | B60N 2/2362 |
| 9,701,223 | B2* | 7/2017 | Tame | B60N 2/2356 |
| 2011/0001346 | A1 | 1/2011 | Yamada et al. | |

(Continued)

FOREIGN PATENT DOCUMENTS

JP 2010-022400 A 2/2010

Primary Examiner — Adam D Rogers
(74) Attorney, Agent, or Firm — McGinn IP Law Group, PLLC (57) ABSTRACT

A reclining device includes: a first member; a pawl having external teeth; a second member; a cam; and a spring, which biases the cam to move the pawl in the direction where the external teeth engage with the internal teeth, the pawl guide includes a first pawl guide and a second pawl guide, a wedge-shaped space is formed between the pawl and the first pawl guide, and a width of the wedge-shaped space is gradually reduced in a direction where the pawl is guided, an end of the spring is inserted into the wedge-shaped space, and the end of the spring is directly wedged into the wedge-shaped space, thereby pressing the pawl against the second pawl guide.

5 Claims, 11 Drawing Sheets (56) References Cited

U.S. PATENT DOCUMENTS

| | | | |
|---|---|---|---|
| 2013/0161995 A1* | 6/2013 | Yamada | B60N 2/12 297/367 P |
| 2014/0077559 A1* | 3/2014 | Higashi | B60N 2/235 297/354.1 |
| 2016/0023578 A1* | 1/2016 | Tame | B60N 2/2356 297/354.12 |
| 2017/0158093 A1* | 6/2017 | Kojima | B60N 2/2358 |
| 2017/0203671 A1* | 7/2017 | Runde | B60N 2/2356 |
| 2017/0253151 A1* | 9/2017 | Maeda | B60N 2/20 |

\* cited by examiner

RECLINING DEVICE

CROSS-REFERENCE TO RELATED APPLICATION

This application claims priority from Japanese Patent Application No. 2015-157617 filed on Aug. 7, 2015, the entire subject matter of which is incorporated herein by reference.

TECHNICAL FIELD

This disclosure relates to a reclining device that includes a first member having internal teeth, a pawl having external teeth that may engage with the internal teeth, a second member that is formed to be rotatable relative to the first member and has a pawl guide to guide the pawl between a lock position where the external teeth engage with the internal teeth, and an unlock position where the external teeth disengage from the internal teeth, a cam that moves the pawl in a direction where the external teeth engage with the internal teeth, and a spring that biases the pawl towards the lock position, so that the external teeth of the pawl engage with the internal teeth of the first member, thereby suppressing relative rotation between the first and second members.

BACKGROUND

As an example, there is a reclining device configured as follows: the apparatus includes a first member that has internal teeth on an inner cylindrical surface in a circumferential direction thereof, is open at one surface thereof, and has the shape of a bottomed cylinder, a pawl having external teeth that may engage with the internal teeth, a second member that is disposed on an opened side of the first member, is formed to be rotatable relative to the first member in the circumferential direction, and has a pawl guide to guide the pawl between a lock position where the external teeth engage with the internal teeth, and an unlock position where the external teeth disengage from the internal teeth, a cam that is rotatably formed between the first and second members and moves the pawl in a direction where the external teeth engage with the internal teeth, so that the external teeth of the pawl engage with the internal teeth of the first member, thereby suppressing relative rotation between the first and second members.

In such a reclining device, in order to eliminate looseness between the pawl in the lock position and the pawl guide and to suppress a seatback from being loosened, there has been proposed a reclining device that further includes a second cam to push the pawl in the lock position against the pawl guide and eliminate looseness between the pawl in the lock position and the pawl guide (for example, see JP-A-2010-022400).

SUMMARY

However, the structure described in JP-A-2010-022400 additionally requires the second cam to eliminate looseness between the pawl in the lock position and the pawl guide.

Therefore, the reclining device is problematic in that the number of components is increased and thereby a weight of the apparatus is increased. Since the second cam is usually a very small component, it is difficult to machine the second cam.

This disclosure provides a reclining device in which the second cam for pushing the pawl against the pawl guide is not required.

A reclining device according to one aspect of this disclosure includes: a first member, which has internal teeth formed on an inner cylindrical surface along a circumferential direction and has a bottomed cylinder shape in which one face is opened; a pawl having external teeth, which are engageable with the internal teeth; a second member, which is disposed at an opened side of the first member and which is formed to be rotatable relative to the first member in the circumferential direction, wherein the second member has a pawl guide that guides the pawl between a lock position where the external teeth engage with the internal teeth and an unlock position where the external teeth disengage from the internal teeth; a cam, which is rotatably provided between the first and second members and moves the pawl in a direction where the external teeth engage with the internal teeth; and a spring, which biases the cam to move the pawl in the direction where the external teeth engage with the internal teeth, so that the external teeth of the pawl engage with the internal teeth of the first member and the relative rotation between the first and second members is suppressed, wherein the pawl guide includes a first pawl guide and a second pawl guide, wherein a wedge-shaped space is formed between the pawl and the first pawl guide, and a width of the wedge-shaped space is gradually reduced in a direction where the pawl is guided, wherein an end of the spring is inserted into the wedge-shaped space, and wherein the end of the spring is directly wedged into the wedge-shaped space, thereby pressing the pawl against the second pawl guide.

Other features of this disclosure will be more clearly understood from the following detailed description taken in conjunction with the accompanying drawings.

According to one aspect of the reclining device, the pawl guide includes the first and second pawl guides, and the wedge-shaped space is formed between the pawl and the first pawl guide to be gradually reduced in a direction where the pawl is guided, so that one end of the spring is inserted into the wedge-shaped space. As one end of the spring is directly wedged into the wedge-shaped space, the pawl is pressed against the second pawl guide, thereby eliminating the looseness between the pawl and the pawl guide. Consequently, the second cam for pushing the pawl against the pawl guide is not required unlike the related art.

Other effects of this disclosure will be more clearly understood from the following detailed description taken in conjunction with the accompanying drawings.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

An exemplary embodiment will be described with reference to the accompanying drawings.

Figure 7:
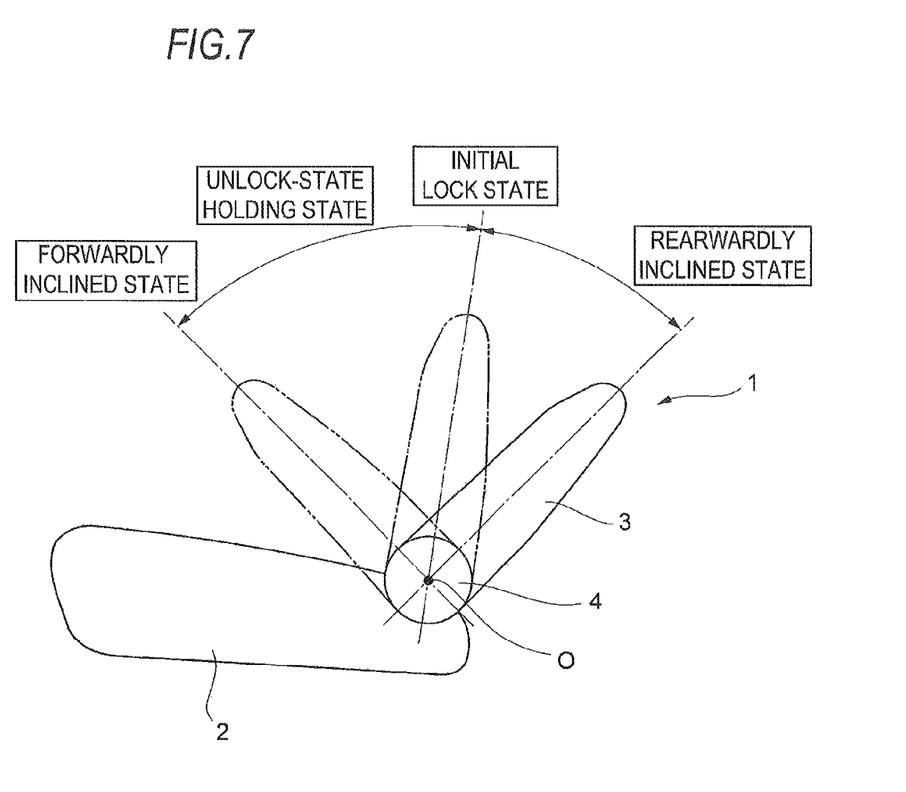
FIG. 7 is a configuration view illustrating a seat equipped with the reclining device according to the present embodiment.

First, a seat equipped with a reclining device according to the present embodiment will be described with reference to FIG. 7. The seat 1 includes a seat cushion 2 that supports a seating portion for an occupant, and a seatback 3 that is formed to be tiltable forwards or backwards relative to the seat cushion 2 and supports an occupant's back. Reference numeral 4 denotes the reclining device that is formed on a tiltable axis "O" of the seatback 3 to allow or suppress the tilting of the seatback 3.

The reclining device 4 is tiltable from a forwardly inclined state to a backwardly inclined state. In a state from an initial lock state to a backwardly inclined state and in the forwardly inclined state, the tilting of the seatback 3 can be allowed and suppressed with manipulating an operating lever. Meanwhile, in a state from the initial lock state to the forwardly inclined state, an unlock-state holding state is maintained by an unlock-state holding mechanism that will be described later in detail, and the seat cushion is tiltable without manipulating an operating lever.

The present embodiment has reclining devices on the left and right of the seat, and since the reclining devices have the same configuration, the reclining device 4 on only one side will be described below.

Figure 1:
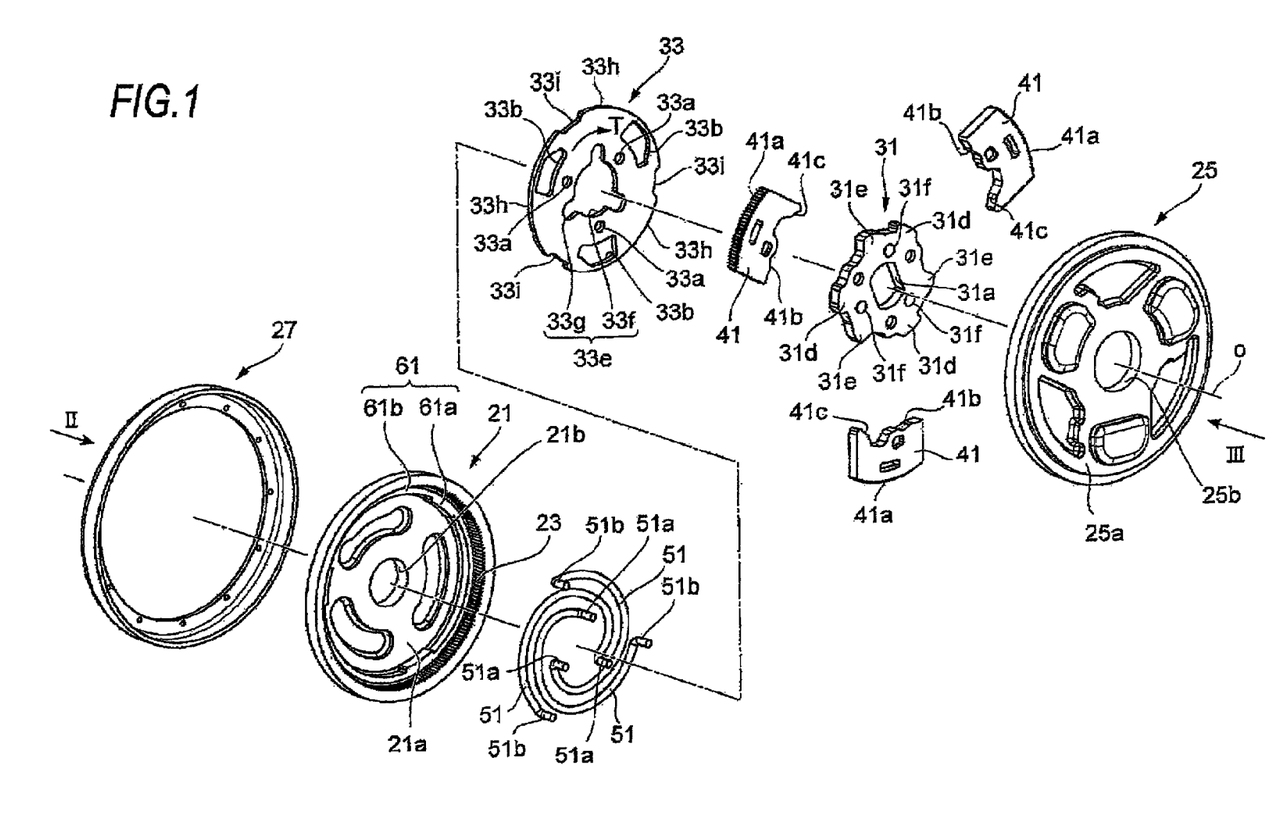
FIG. 1 is an exploded perspective view illustrating a reclining device according to the present embodiment.
Figure 2:
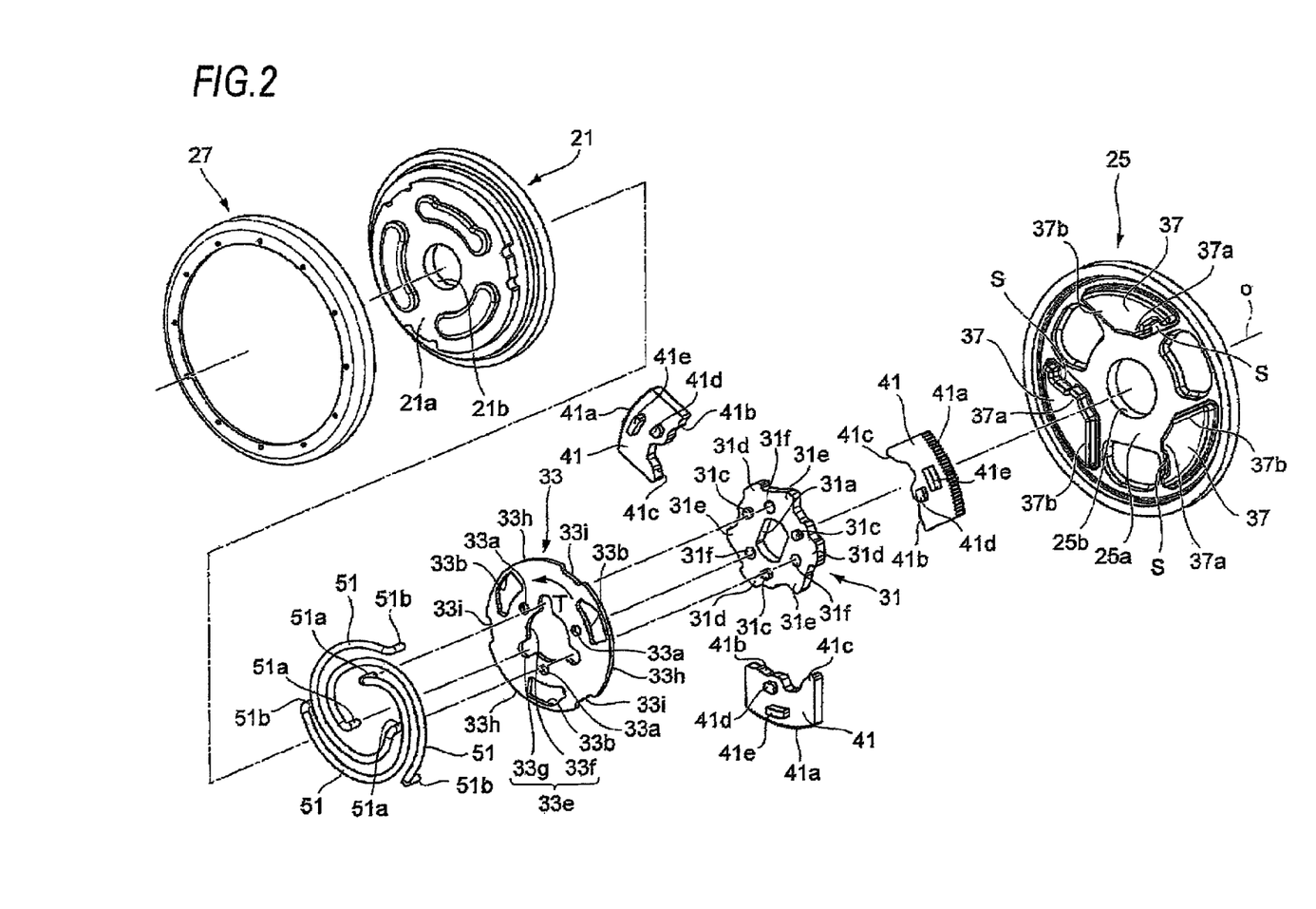
FIG. 2 is an exploded perspective view when seen from a direction of arrow II of FIG. 1.
Figure 3:
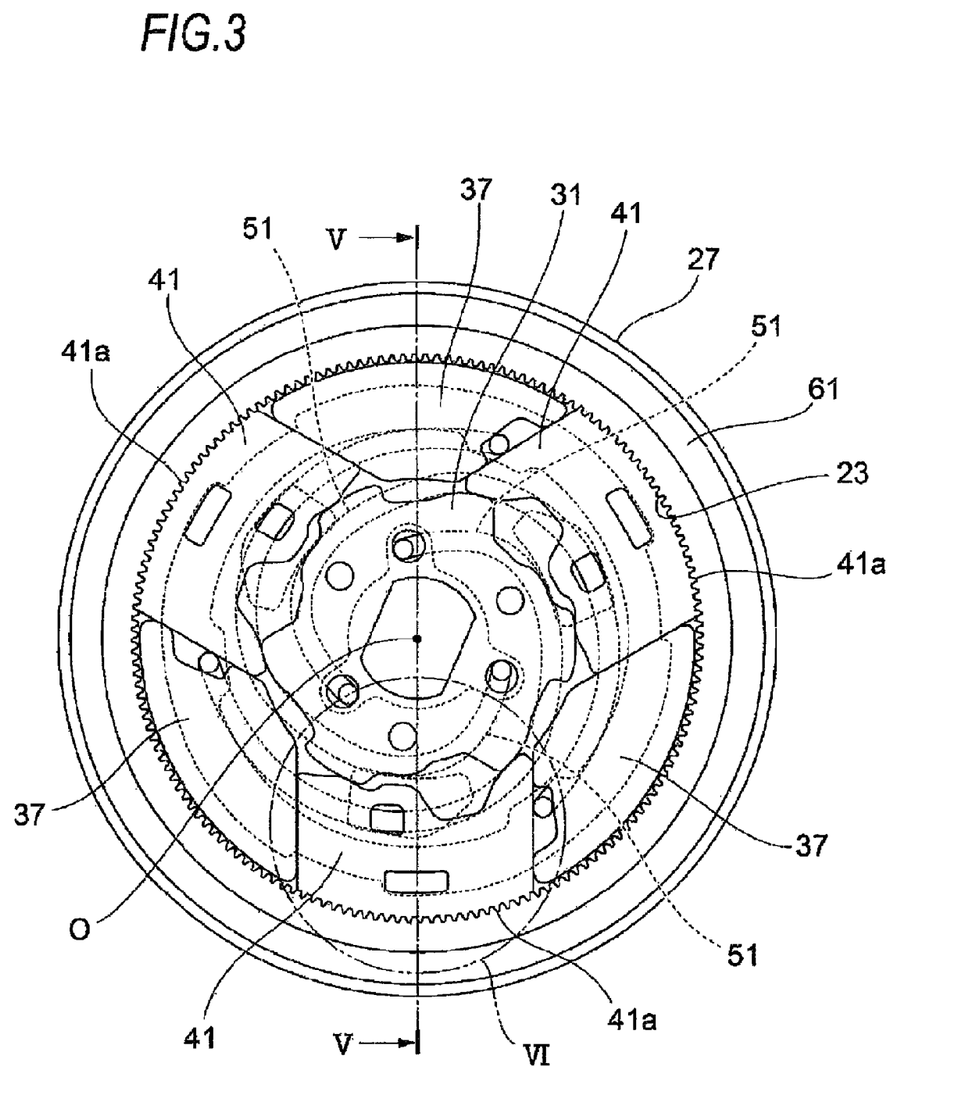
FIG. 3 is a front view illustrating a lock state when seen from a direction of arrow III, in the state where components of the reclining device of FIG. 1 are mounted and a second member other than a pawl guide is excluded.
Figure 4:
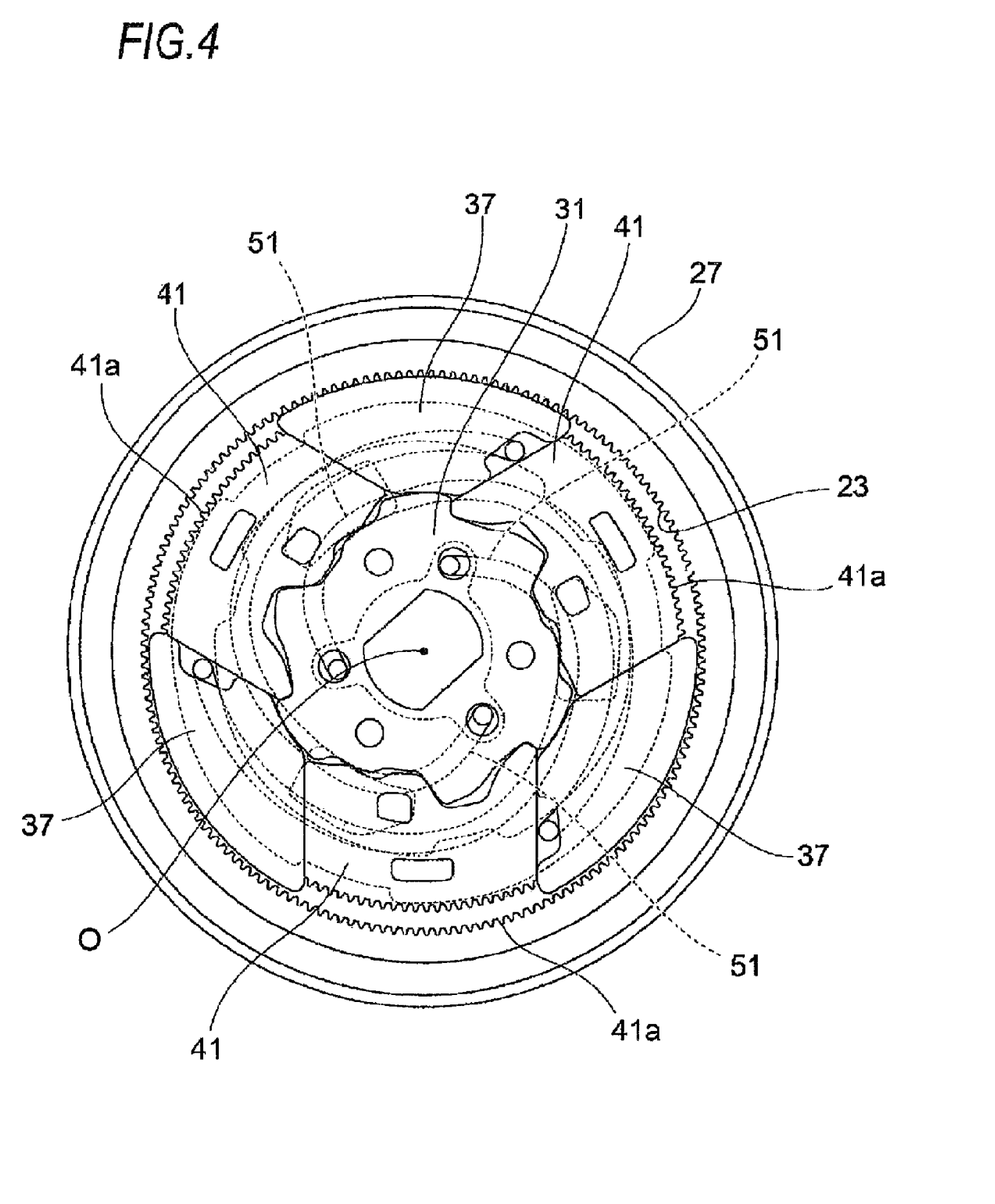
FIG. 4 is a front view illustrating an unlock state in FIG. 3.
Figure 5:
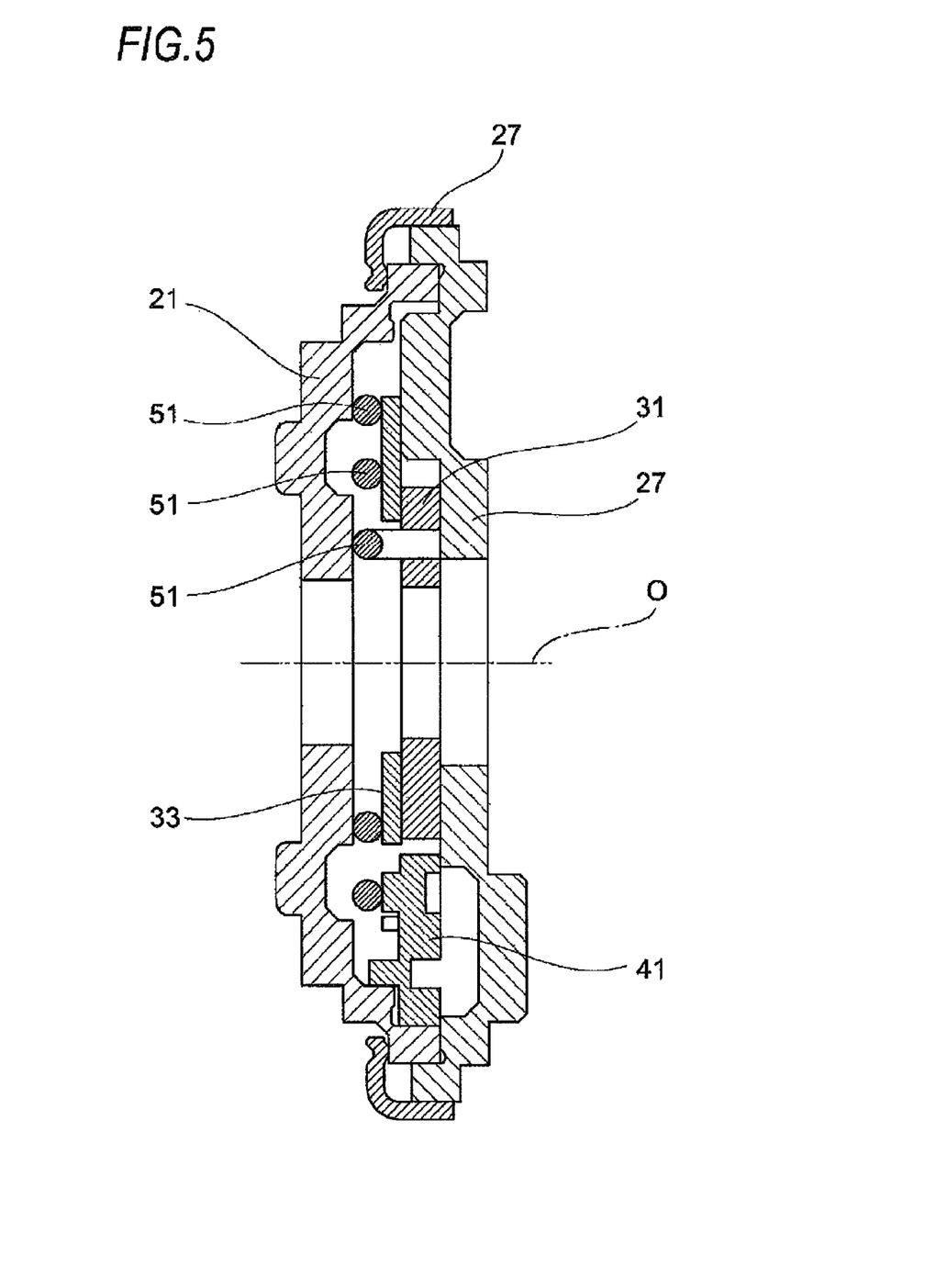
FIG. 5 is a sectional view taken along line V-V of FIG. 3, in the state where the second member is mounted.
Figure 6:
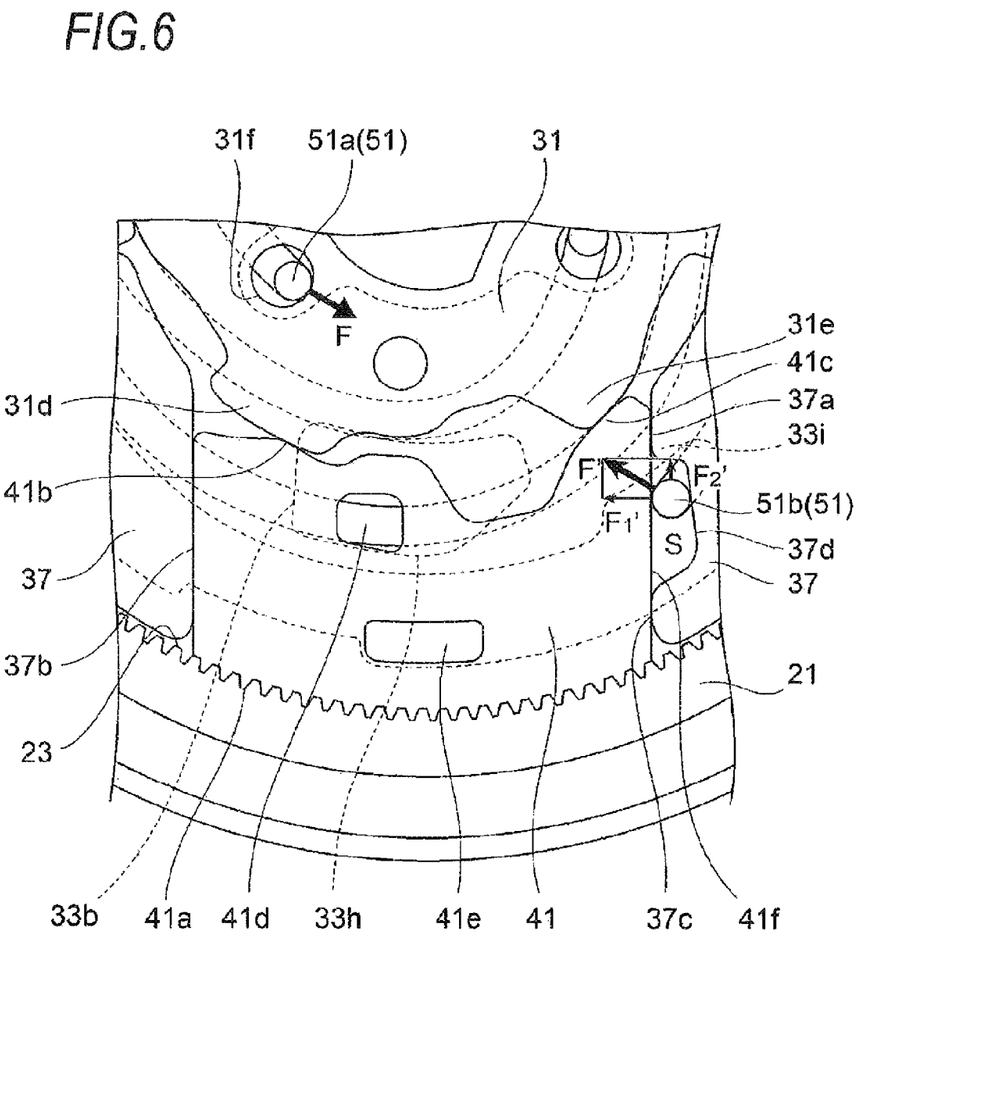
FIG. 6 is an enlarged view illustrating portion VI encircled in FIG. 3.

The reclining device 4 will be described with reference to FIGS. 1 to 6. FIG. 1 is an exploded perspective view illustrating the reclining device according to the present embodiment, FIG. 2 is an exploded perspective view when seen from a direction of arrow II of FIG. 1, FIG. 3 is a front view illustrating a lock state when seen from a direction of arrow III, in the state where components of the reclining device of FIG. 1 are mounted and a second member other than a pawl guide is excluded, FIG. 4 is a front view illustrating an unlock state in FIG. 3, FIG. 5 is a sectional view taken along line V-V of FIG. 3, in the state where the second member is mounted, and FIG. 6 is an enlarged view illustrating portion VI encircled in FIG. 3.

First, an entire configuration will be described with reference to FIGS. 1 and 2.

A ratchet (first member) 21 provided on a seatback 3 side has the shape of a bottomed cylinder that is made by half blanking a disc-shaped plate by a press working, and has a circular concave part 21a formed in the ratchet. Internal teeth 23 are formed throughout an inner circumference of the circular concave part 21a in a circumferential direction. Further, a through hole 21b is formed in a center of the circular concave part 21a so that a shaft (not illustrated) disposed along the tiltable rotating axis (axis "O" in FIGS. 1 and 2) of the seatback 3 is movably inserted into the through hole. The cross section of the shaft (not illustrated) of the exemplary embodiment has the oval shape.

Similarly to the ratchet 21, a base plate (second member) 25 provided on a seat cushion 2 side is also made by half blanking a disc-shaped plate by a press working, and has a circular concave part 25a formed in the base plate. A diameter of the circular concave part 25a is set to be slightly larger than an outer diameter of the ratchet 21. The ratchet 21 is fitted into the circular concave part 25a, and the base plate 25 is rotatable relative to the ratchet 21. Further, a through hole 25b is formed in a center of the base plate 25 so that the shaft (not illustrated) is movably inserted into the through hole.

An outer circumference of the ratchet 21 and an outer circumference of the base plate 25 are clamped by an annular outer circumferential ring 27, so that the ratchet 21 and the base plate 25 are held to be rotatable relative to each other without being separated from each other in the direction of the relative rotating axis "O".

A cam 31 is disposed in a space which is formed by the circular concave part 21a of the ratchet 21 and the circular concave part 25a of the base plate 25. An elliptical hole 31a is formed in a center of the cam 31 so that the shaft (not illustrated) is fitted into the elliptical hole. The shaft (not illustrated) is rotated integrally with the cam 31. Therefore, this shaft (not illustrated) becomes a transmission member that transmits motion of the cam 31 of one of the reclining devices provided on both sides of the seat to the cam of the other reclining device. Three protrusions 31c are formed on the cam 31 to protrude towards the ratchet 21. Three first protrusions 31d and three second protrusions 31e are alternately formed on the outer circumference of the cam 31 in a circumferential direction. Three holes 31f are formed in the cam 31 so that three linear springs 51, which will be described later, are fitted into the holes.

A release plate (release cam) 33 is placed between the cam 31 and the circular concave part 21a of the ratchet 21. Holes 33a are formed in the release plate 33, and the three protrusions 31c of the cam 31 are fitted into the holes 33a. As the protrusion 31c are fitted into the holes 33a, the cam 31 is rotated integrally with the release plate 33. A hole 33e is formed in a central portion of the release plate 33. The hole 33e includes a circular hole portion 33f into which the shaft (not illustrated) is movably inserted, and three projecting holes 33g which extend from a peripheral portion of the circular hole portion 33f in a diametric direction. The projecting holes 33g are arranged at the pitch of approximately 120 degrees in the circumferential direction having the axis "O" as the center. The width and the diametric length of each projecting hole 33g are set to be larger than the diameter of the spring that will be described later.

Three pawls 41 are arranged between the release plate 33 and the circular concave part 25a of the base plate 25 in the circumferential direction having the axis "O" as the center. According to this embodiment, the pawls 41 are arranged at the pitch of approximately 120 degrees in the circumferential direction having the axis "O" as the center. External teeth 41a are formed in a surface of each pawl 41 facing the internal teeth 23 to engage with the internal teeth 23. A first contacted portion 41b that can be in contact with the first protrusion 31*d* of the cam 31 and a second contacted portion 41*c* that can be in contact with the second protrusion 31*e* of the cam 31 are formed on a surface opposite to a surface on which the external teeth 41*a* of the pawl 41 are formed.

Three pawl guide protrusions 37 are formed on the circular concave part 25*a* of the base plate 25 at the pitch of 120 degrees in the circumferential direction of a circle having the relative rotating axis "O" as the center. Each pawl 41 can be moved only in a diametric direction of the circle having the relative rotating axis "O" as the center by two neighboring pawl guide protrusions 37. That is, the pawl guide protrusion 37 guides the pawl 41 between the lock position where the external teeth 41*a* engage with the internal teeth 23 of the ratchet 21, and the unlock position where the external teeth 41*a* disengage from the internal teeth 23 of the ratchet 21.

A protrusion 41*d* is formed on a surface of the pawl 41 facing the release plate 33 to protrude towards the release plate 33. A cam hole 33*b* is formed in the release plate 33 so that the protrusion 41*d* of the pawl 41 is fitted into the cam hole. An inclined face that is in contact with the protrusion 41*d* of the pawl 41 is formed in the cam hole 33*b*. The included surface is formed to move the pawl 41 along the pawl guide protrusion 37 in a direction (unlock direction) where the external teeth 41*a* of the pawl 41 disengage from the internal teeth 23 of the ratchet 21, if the release plate 33 rotates in a direction opposite to a direction illustrated by arrow T in FIGS. 1 and 2.

The three linear spring 51 curved in a substantially C shape are disposed between the release plate 33 and the circular concave part 21*a* of the ratchet 21.

Now, the unlock-state holding mechanism for holding the pawl 41 of this embodiment in the unlock position will be described.

As illustrated in FIG. 1, an arc-shaped guide 61 is circumferentially formed on an inner cylindrical surface that is lower than the internal teeth 23 of the ratchet (first member) 21 to protrude towards the relative rotating axis "O". The guide 61 includes two kinds of arc-shaped protrusions that are different from each other in protruding degree towards the relative rotating axis "O". A first arc-shaped protrusion is three small-diameter portions 61*a* each having a central angle that is equal to an angle in the unlock-state holding state of the reclining device. A second protrusion is three large-diameter portions 61*b* that are positioned between the three small-diameter portions 61*a*, and diametric protruding degrees thereof is smaller than the small-diameter portions 61*a*.

As illustrated in FIG. 2, the pawl 41 has a protrusion 41*e* that can be in contact with the arc-shaped guide 61 (small-diameter portions 61*a* and large-diameter portions 61*b*) of the ratchet 21.

The protruding degree of the large-diameter portion 61*b* is set such that the external teeth 41*a* of the pawl 41 can engage with the internal teeth 23 of the ratchet 21, in the state where the protrusion 41*e* of the pawl 41 faces the large-diameter portion 61*b* of the guide 61 of the ratchet 21. Meanwhile, the protruding degree of the small-diameter portion 61*a* is set such that the external teeth 41*a* of the pawl 41 can not engage with the internal teeth 23 of the ratchet 21, in the state where the protrusion 41*e* of the pawl 41 faces the small-diameter portion 61*a* of the guide 61 of the ratchet 21.

Therefore, according to this embodiment, the unlock-state holding mechanism is formed to hold the pawl 41 in the unlock position with the small-diameter portion 61*a* of the guide 61 of the ratchet (first member) 21 and the protrusion 41*e* of the pawl 41.

Next, the exemplary embodiment of this disclosure will be described with reference to FIGS. 1 and 6.

Two neighboring pawl guide protrusions 37 provided on opposite sides of the pawl 41 include a first pawl guide 37*a* that faces a side of the pawl 41 and a second pawl guide 37*b* that faces another side of the pawl 41, respectively.

A wedge-shaped space S is formed between a pawl wall portion 41*f* of the pawl 41 facing the first pawl guide 37*a* and a pawl guide wall portion 37*c* of the first pawl guide 37*a* facing the pawl 41 such that a distance between both the wall portions is gradually reduced in the direction (diametric direction of the circle having the relative rotating axis "O" as the center) where the pawl 41 is guided.

According to this embodiment, the first pawl guide 37*a* has a base face that is inclined relative to the pawl guide wall portion 37*c* and the pawl wall portion 41*f*, and a notch 37*d* is formed such that a width in the circumference direction of the circle having the relative rotating axis "O" as the center is gradually reduced towards the relative rotating axis "O", thereby defining the wedge-shaped space S.

A first end 51*a* is provided on one end of each of the three linear springs 51 to be bent towards the base plate 25, and a second end 51*b* is provided on the other end 51 to be bent towards the base plate 25.

In the state where the linear spring 51 is elastically deformed, the first end 51*a* passes through the projecting hole 33*g* of the hole 33*e* of the release plate 33 and is fitted into the hole 31*f* formed in the cam 31, and the second end 51*b* is inserted into the wedge-shaped space S.

As illustrated in FIG. 6, due to the elastic repulsive force of the linear spring 51, the first end 51*a* of the linear spring 51 presses an inner wall surface of the hole 31*f* of the cam 31 by force F, and the cam 31 is biased in a direction (one direction) where the first protrusion 31*d* and the second protrusion 31*e* come into contact with the first contacted portion 41*b* and the second contacted portion 41*c* of the pawl 41, respectively.

The second end 51*b* inserted into the wedge-shaped space S directly presses the pawl wall portion 41*f* of the pawl 41 by force F'. A component force F1' of F' presses the pawl wall portion 41*f* in a direction where looseness between the pawl 41 and the second pawl guide 37*b* is eliminated. Further, a component force F2' of F' biases the second end 51*b* of the linear spring 51 in a direction where it is wedged into the wedge-shaped space S, namely, in a direction of the unlock position of the pawl 41.

In this embodiment, three convex parts 33*h* and three concave parts 33*i* are alternately formed on a circumference of the release plate 33. In the lock state where the external teeth 41*a* of the pawl 41 engage with the internal teeth 23*a* of the ratchet 21, the convex parts 33*h* and the concave parts 33*i* of the release plate 33 are formed such that the second end 51*b* of the linear spring 51 faces the concave part 33*i* of the release plate 33.

An operation of the reclining device configured as above will be described below.

Generally, by the elastic repulsive force of the linear spring 51, the pawl 41 formed on the base plate 25 is in the lock position where the external teeth 41*a* engage with the internal teeth 23 of the ratchet 21 via the cam 31, and the relative rotation between the ratchet (first member) 21 and the base plate (second member) 25 is suppressed, and the seatback is in a state (lock state) where it is not rotatable relative to the seat cushion.

If the cam 31 is operated against the biasing force of the linear spring 51 and is rotated in the other direction (direction opposite to arrow T), the release plate 33 is also rotated because the protrusion 31c of the cam 31 is fitted into the hole 33a of the release plate 33. At first, the circumference of the release plate 33 facing the second end 51b of the linear spring 51 is shifted from the concave part 33i to the convex part 33h. The second end 51b of the linear spring 51 biased in the direction where it is wedged into the wedge-shaped space S is pulled out in a direction opposite to the direction where it is wedged into the wedge-shaped space S by the convex part 33h of the release plate 33, and the pressing of the linear spring 51 against the pawl wall portion 41f is weakened.

When the release plate 33 rotates, the pawl 41 moves to the unlock position where the external teeth 41a disengage from the internal teeth 23 of the ratchet 21 by the inclined face of the cam hole 33b of the release plate 33 into which the protrusion 41d of the pawl 41 is fitted, so that the ratchet (first member) 21 may rotate relative to the base plate (second member) 25 and the seatback may rotate relative to the seat cushion.

When an operating force is released from the cam 31, the cam 31 and the release plate 33 return to their original positions by the biasing force of the linear spring 51, the circumference of the release plate 33 facing the second end 51b of the linear spring 51 is shifted from the convex part 33h to the concave part 33i, and the external teeth 41a of the pawl 41 engage with the internal teeth 23 of the ratchet 21. Thereby, the relative rotation between the ratchet (first member) 21 and the base plate (second member) 25 is suppressed, and the lock state is achieved again.

According to the present embodiment, the following effects may be obtained.

(1) The distance of both wall portions between the pawl wall portion 41f of the pawl 41 facing the first pawl guide 37a and the pawl guide wall portion 37c of the first pawl guide 37a facing the pawl 41, that is, between the pawl 41 and the first pawl guide 37a is gradually reduced in the direction (diametric direction of the circle having the relative rotating axis "O" as the center) where the pawl 41 is guided, thereby defining the wedge-shaped space S, and the second end 51b of the linear spring 51 is inserted into the wedge-shaped space S and the pawl wall portion 41f of the pawl 41 is pressed by force F. The component force F1' of F' presses the pawl wall portion 41f in a direction where looseness between the pawl 41 and the second pawl guide 37b is eliminated. Therefore, the looseness between the pawl 41 and the pawl guide protrusion 37 (pawl guide) is eliminated, and the looseness of the seatback is suppressed. Consequently, the conventional second cam for pushing the pawl against the pawl guide is not required.

(2) The release plate 33 pulls out the second end 51b of the linear spring 51 in the direction opposite to the direction where it is wedged into the wedge-shaped space S before the pawl 41 is moved to the unlock position, so that the pressing of the linear spring 51 against the pawl wall portion 41f is weakened and the pawl 41 may be smoothly moved to the unlock position.

(4) The first pawl guide 37a has the notch 37d formed such that the width in the circumference direction of the circle having the relative rotating axis "O" as the center is gradually reduced towards the relative rotating axis "O", thereby defining the wedge-shaped space S. That is, since no notch is formed in the pawl 41, it is possible to suppress the strength of the pawl 41 from being lowered.

This disclosure is not limited to the above-described embodiment.

For example, the wedge-shaped space S may have the shapes illustrated in FIGS. 8 to 14.

Components common to both the exemplary embodiments of FIGS. 8 to 14 and the exemplary embodiments of FIGS. 1 to 7 will carry the same reference numerals, and duplicated description thereof will be omitted herein.

Figure 8:
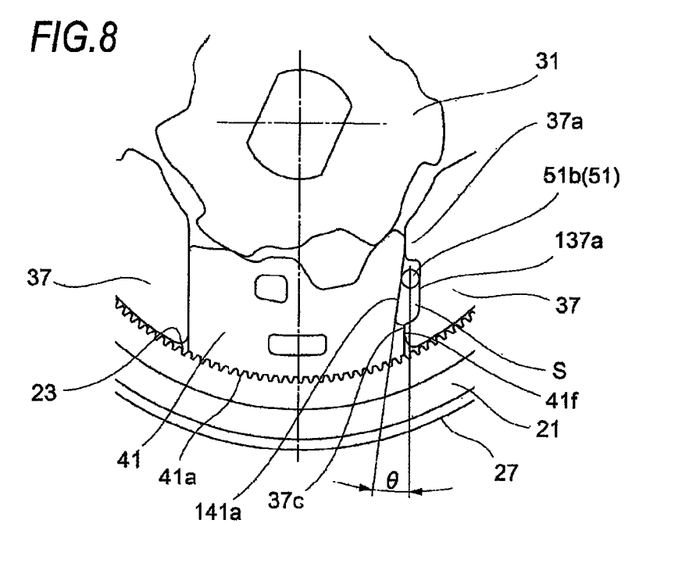
FIG. 8 is a view illustrating an example of another shape of a wedge-shaped space.
Figure 9:
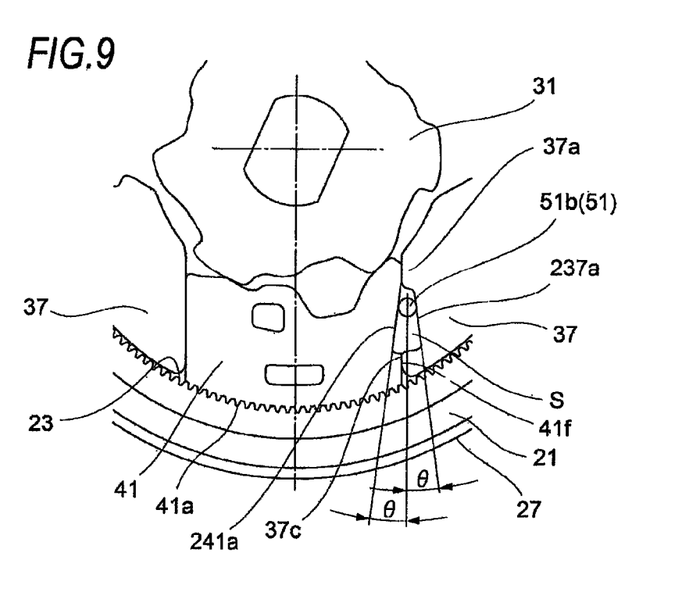
FIG. 9 is a view illustrating an example of another shape of the wedge-shaped space.
Figure 10:
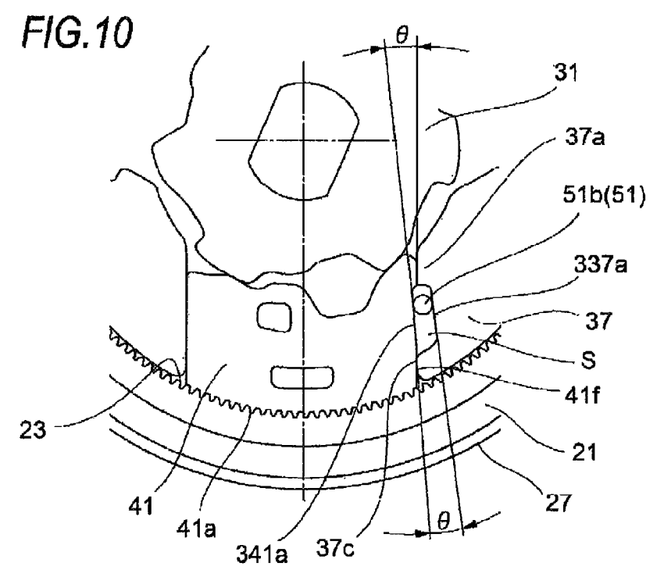
FIG. 10 is a view illustrating an example of another shape of the wedge-shaped space.

First, FIGS. 8 to 10 illustrate examples of other shapes of the wedge-shaped space S formed such that the width in the circumference direction of the circle having the relative rotating axis "O" as the center is gradually reduced towards the relative rotating axis "O", in the same manner as the exemplary embodiment.

In FIG. 8, a notch 141a having a base face inclined relative to the pawl guide wall portion 37c and the pawl wall portion 41f is formed in the pawl 41, and a notch 137a parallel to the pawl guide wall portion 37c and the pawl wall portion 41f is formed in the first pawl guide 37a.

In FIG. 9, notches 241a and 237a having base faces inclined relative to the pawl guide wall portion 37c and the pawl wall portion 41f are formed in the pawl 41 and the first pawl guide 37a, respectively.

Both the base faces of the notches 241a and 237a are inclined faces formed such that the depths of the notches are reduced towards the relative rotating axis "O".

In FIG. 10, notches 341a and 337a having base faces inclined relative to the pawl guide wall portion 37c and the pawl wall portion 41f are formed in the pawl 41 and the first pawl guide 37a, respectively.

The base face of the notch 337a is an inclined face formed such that the depth of the notch is reduced towards the relative rotating axis "O", while the base face of the notch 341a is an inclined face formed such that the depth of the notch is increased towards the relative rotating axis "O".

Next, FIGS. 11 to 14 are different from the exemplary embodiment, and illustrate examples of shapes of a wedge-shaped space S' formed such that the width in the circumference direction of the circle having the relative rotating axis "O" as the center is gradually increased towards the relative rotating axis "O".

Figure 11:
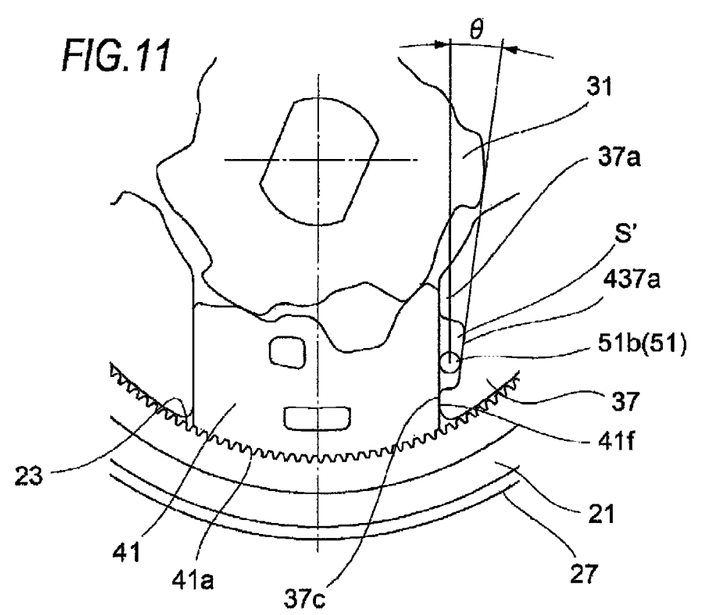
FIG. 11 is a view illustrating an example of another shape of the wedge-shaped space.

In FIG. 11, a notch 437a having a base face inclined relative to the pawl guide wall portion 37c and the pawl wall portion 41f is formed on only the first pawl guide 37a.

Figure 12:
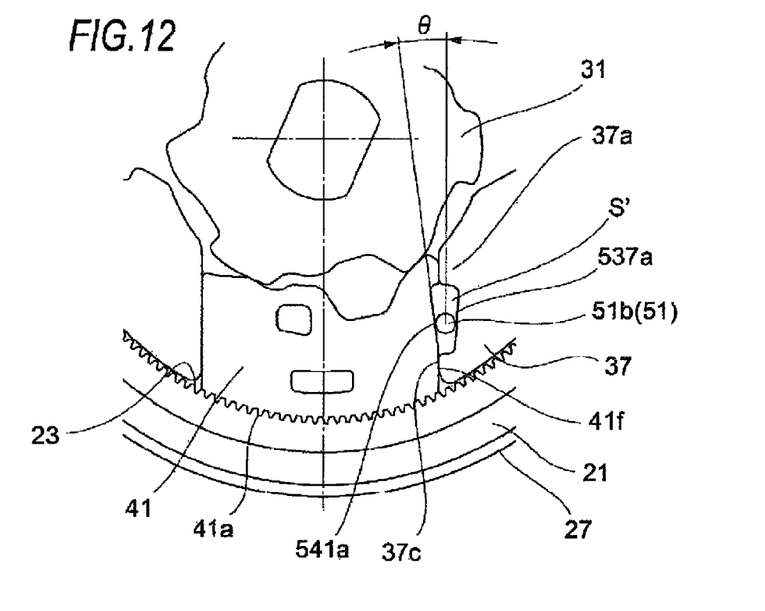
FIG. 12 is a view illustrating an example of another shape of the wedge-shaped space.

In FIG. 12, a notch 541a having a base face inclined relative to the pawl guide wall portion 37c and the pawl wall portion 41f is formed in the pawl 41, and a notch 537a parallel to the pawl guide wall portion 37c and the pawl wall portion 41f is formed in the first pawl guide 37a.

Figure 13:
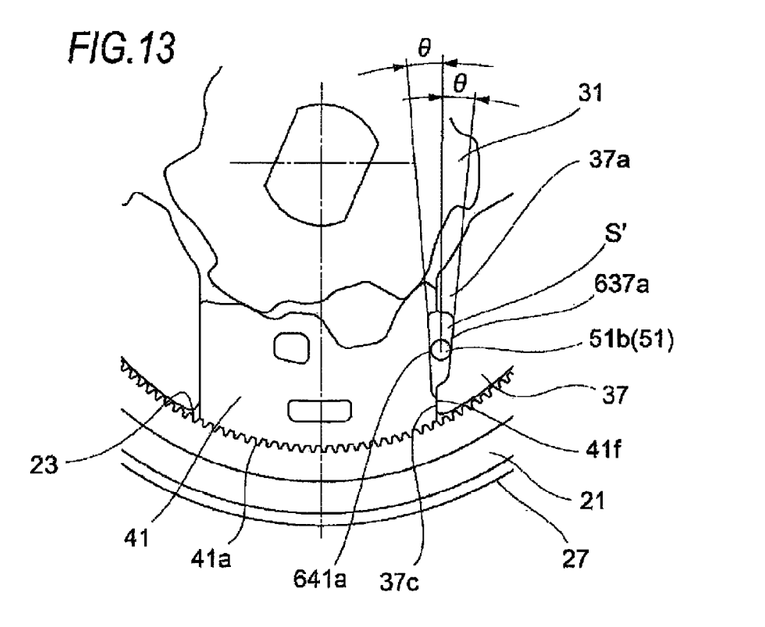
FIG. 13 is a view illustrating an example of another shape of the wedge-shaped space.

In FIG. 13, notches 641a and 637a having base faces inclined relative to the pawl guide wall portion 37c and the pawl wall portion 41f are formed in the pawl 41 and the first pawl guide 37a, respectively.

Both the base faces of the notches 641a and 637a are inclined faces formed such that the depths of the notches are increased towards the relative rotating axis "O". An end of the notch 641a distant from the relative rotating axis "O" circumferentially wraps the pawl wall portion 41c.

Figure 14:
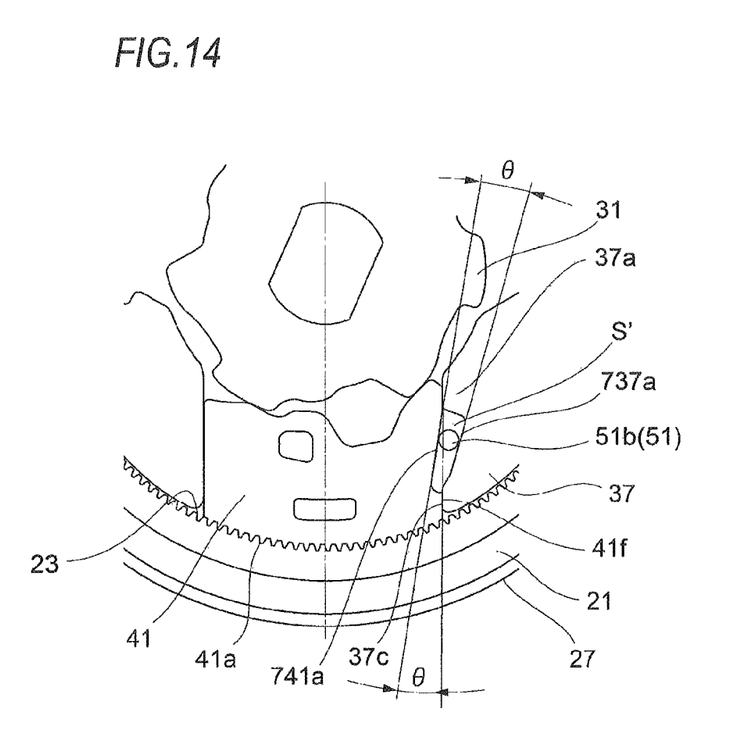
FIG. 14 is a view illustrating an example of another shape of the wedge-shaped space.

In FIG. 14, notches 741a and 737a having base faces inclined relative to the pawl guide wall portion 37c and the pawl wall portion 41f are formed in the pawl 41 and the first pawl guide 37a, respectively.

The base face of the notch 737a is an inclined face formed such that the depth of the notch is increased towards the relative rotating axis "O", while the base face of the notch 741a is an inclined face formed such that the depth of the notch is decreased towards the relative rotating axis "O".

Although, in the above-mentioned embodiment, the first end 51a of the linear spring 51 is fitted into the cam 31 to bias the cam 31, it may be fitted into the release plate 33 that is rotated integrally with the cam 31.

What is claimed is:

1. A reclining device, comprising:
a first member, which has internal teeth formed on an inner cylindrical surface along a circumferential direction and has a cylinder shape, in which one face is opened, having a bottom plane;
a pawl having external teeth, which are engageable with the internal teeth;
a second member, which is disposed at an opened side of the first member and which is formed to be rotatable relative to the first member in the circumferential direction, wherein the second member has a pawl guide that guides the pawl between a lock position where the external teeth engage with the internal teeth and an unlock position where the external teeth disengage from the internal teeth;
a cam, which is rotatably provided between the first and second members and moves the pawl in a direction where the external teeth engage with the internal teeth; and
a spring, which biases the cam to move the pawl in the direction where the external teeth engage with the internal teeth, so that the external teeth of the pawl engage with the internal teeth of the first member and the relative rotation between the first and second members is suppressed,
wherein the pawl guide includes a first pawl guide and a second pawl guide,
wherein a space is formed between the pawl and the first pawl guide,
wherein an end of the spring is inserted into the space, and
wherein the end of the spring directly presses the pawl against the second pawl guide.

2. The reclining device according to claim 1, further comprising:
a release cam, which is rotatably formed between the first and second members and moves the pawl in a direction of the unlock position,
wherein the release cam, which releases the end of the spring from the space, before the pawl is moved in the direction of the unlock position.

3. The reclining device according to claim 1,
wherein the space is defined by a notch, the notch being formed only in the first pawl guide.

4. The reclining device according to claim 1,
wherein a width of the space is narrowed, in a direction where the pawl is guided, and
wherein the end of the spring is directly wedged into the space.

5. The reclining device according to claim 1,
wherein the space formed between the pawl and the first pawl guide is wedge-shaped.

* * * * *